April 28, 1931.  H. A. SELAH  1,802,581
CONDUIT FITTING

Filed Nov. 30, 1925

INVENTOR.
Howard A. Selah
BY
ATTORNEYS.

Patented Apr. 28, 1931

1,802,581

UNITED STATES PATENT OFFICE

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed November 30, 1925. Serial No. 72,180.

This invention is designed to improve conduit fittings, particularly such fittings as are adapted for use with threadless conduits. It is desirable under some conditions to make the conduit fittings water-tight and the present invention is designed to assure an approximately complete closure of fittings of this class. Features and details of the invention will appear from the specification and claims.

The invention is illustrated in the accompanying drawings as follows:—

Figure 1:
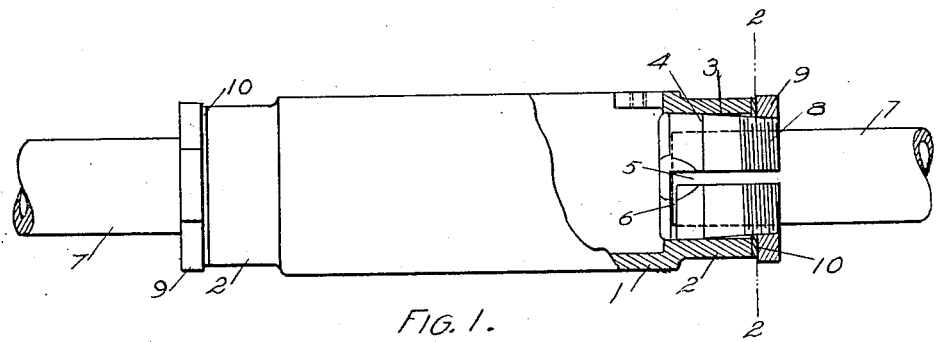

Fig. 1 is a side elevation of a fitting in the form of a conduit box, partly in section.

Figure 2:
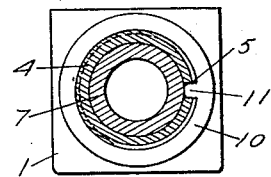

Fig. 2 a section on the line 2—2 in Fig. 1.

Figure 3:
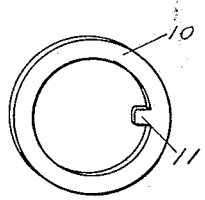

Fig. 3 a perspective view of a gasket.

1 marks the body of the box. This has an extension 2 with a tapered opening 3 therethrough.

A contractible sleeve 4 has its outer surface in wedging engagement with the walls of the opening 3. This sleeve has a longitudinal slit 5 and circumferential slits 6. The outer end of the sleeve is screw-threaded at 8 and a nut 9 operates on the screw-thread to draw the sleeve 4 into the opening 3 to contract the same and clamp an inserted conduit 7.

A gasket ring 10 is arranged around the sleeve between the end of the extension 2 and the nut 9. This has an inwardly projecting nib 11 which extends into the slit 5.

As the sleeve is drawn up by the nut the sleeve is contracted reducing the width of the slit 5 and thus compressing and forcing the nib into intimate or pressure contact with the conduit. At the same time the pressure on the gasket between the end of the extension and the nut forces a flow of this metal so as to completely close the joint between the sleeve and opening 3. The flow of the metal is sufficient both as to the nib and the surrounding gasket to completely close the joint.

What I claim as new is:—

1. In a conduit fitting, the combination of a body having a conduit opening; a contractible conduit receiving sleeve in the opening having a longitudinal slit therein, the walls of the opening and the sleeve having wedging surfaces; a gasket surrounding the sleeve having a nib extending into the slit; and a nut on the sleeve drawing the sleeve into the opening to compress the same, said nut clamping the gasket against the wall of the fitting.

2. In a conduit fitting, the combination of a body having a conduit-receiving opening; a longitudinally slotted contractible sleeve in the opening adapted to receive a conduit; a shoulder on the sleeve, said shoulder facing the body; a gasket between the shoulder and body surrounding the sleeve having a nib extending into the slot; and means contracting the sleeve and moving the shoulder toward the body to clamp the gasket between the shoulder and the body and to compress the nib in the slot.

3. In a conduit fitting, the combination of a body having a conduit-receiving opening; a longitudinally slotted contractible sleeve in the opening; a nut on the sleeve forming a shoulder facing the body; a gasket between the shoulder and the body surrounding the sleeve and having a nib extending into the sleeve; and means contracting the sleeve compressing the nib in the slot, said gasket being clamped between the body and the nut as the nut is set up on the sleeve.

In testimony whereof I have hereunto set my hand.

HOWARD A. SELAH.